(12) United States Patent
Fukumoto

(10) Patent No.: US 9,229,215 B2
(45) Date of Patent: Jan. 5, 2016

(54) OCULAR LENS AND OPTICAL APPARATUS

(71) Applicant: Nikon Vision Co., Ltd., Shinagawa-ku, Tokyo (JP)

(72) Inventor: Satoshi Fukumoto, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 14/389,608

(22) PCT Filed: Feb. 27, 2013

(86) PCT No.: PCT/JP2013/055130
§ 371 (c)(1),
(2) Date: Sep. 30, 2014

(87) PCT Pub. No.: WO2013/146038
PCT Pub. Date: Oct. 3, 2013

(65) Prior Publication Data
US 2015/0055216 A1 Feb. 26, 2015

(30) Foreign Application Priority Data

Mar. 30, 2012 (JP) ................................. 2012-079816

(51) Int. Cl.
*G02B 25/00* (2006.01)
*G02B 23/02* (2006.01)
(Continued)

(52) U.S. Cl.
CPC *G02B 23/02* (2013.01); *G02B 9/62* (2013.01); *G02B 25/001* (2013.01); *G02B 13/18* (2013.01)

(58) Field of Classification Search
CPC .................................................... G02B 25/001
USPC ......................................... 359/431, 643, 645
See application file for complete search history.

(56) References Cited

U.S. PATENT DOCUMENTS 4,286,844 A 9/1981 Nagler
5,546,228 A * 8/1996 Ouchi ........................... 359/644
(Continued)

FOREIGN PATENT DOCUMENTS

JP 2010-237430 A 10/2010
JP 2011-227318 A 11/2011

OTHER PUBLICATIONS

International Search Report from International Patent Application No. PCT/JP2013/055130, Jun. 4, 2013.
(Continued)

*Primary Examiner* — Frank Font
(74) *Attorney, Agent, or Firm* — Miles & Stockbridge P.C.

(57) ABSTRACT

There are provided an ocular lens in which aberrations are favorably corrected across a sufficiently wide angle of view and a lens diameter is suppressed from increasing with a sufficient eye relief attained and without a total length being long, and an optical apparatus including the ocular lens. An ocular lens 3 used for an optical apparatus such as a telescope optical system TS includes: in order from an object side, a first lens group G1 including a first lens component G1A having negative refractive power and having a concave surface facing a viewer's eye side, a second lens component G1B in a meniscus shape having a convex surface facing the object side, and a third lens component G1C having positive refractive power; a second lens group G2 having a lens component having a convex surface facing the viewer's eye side; a third lens group G3 having positive refractive power. An object side focal plane of the third lens group G3 is positioned between the second lens group G2 and the third lens group G3.

14 Claims, 11 Drawing Sheets

(51) Int. Cl.
*G02B 9/62* (2006.01)
*G02B 13/18* (2006.01)

(56) References Cited

U.S. PATENT DOCUMENTS 5,663,834 A * 9/1997 Koizumi .................... 359/643
8,503,089 B2 * 8/2013 Fukumoto .................... 359/643
8,958,151 B2 * 2/2015 Miyazaki .................... 359/422
2013/0308208 A1 * 11/2013 Fukumoto .................... 359/771

OTHER PUBLICATIONS

International Preliminary Report on Patentability from International Patent Application No. PCT/JP2013/055130, Oct. 1, 2014.

* cited by examiner

OCULAR LENS AND OPTICAL APPARATUS

TECHNICAL FIELD

The present invention relates to an ocular lens and an optical apparatus.

BACKGROUND ART

An ocular lens is used for further magnifying and observing a real image formed by an objective lens, for example, in a telescope, binoculars, a microscope and the like. Such an ocular lens is required to have a sufficient eye relief (on-axis distance between the lens surface, of the ocular lens, that is closest to the viewer's eye side and the eye point) for comfortable observation, and in the nature of things, to correct aberrations across a wide angle of view favorably. However, it is generally well known that the large apparent field of view of the ocular lens causes the eye relief with sufficient length to be difficult to be secured, and the aberrations of light flux in the periphery of the visual field, in particular, the curvature of field and the astigmatism to deteriorate drastically.

Therefore, for example, an ocular lens is disclosed with a configuration in which a negative lens group is disposed on the object side, a positive lens group is disposed on the viewer's eye side, and a field stop is included therebetween (for example, Patent Literature 1). The ocular lens with this kind of configuration disclosed in Patent Literature 1 secures a long eye relief by disposing the negative lens group on the object side. In addition to this, the negative lens group having strong refractive power is included, and thereby, the Petzval sum can be made small, which allows a condition for favorably correcting the curvature of field to be attained. In this type of ocular lens, when the ratio of the focal length of the negative lens group on the object side to the focal length of the positive lens group on the viewer's eye side is closer to 1:1, the Petzval sum can be smaller, and this is advantageous for correction of the curvature of field and the like.

CITATION LIST

Patent Literature

Patent Literature 1: U.S. Pat. No. 4,286,844

SUMMARY OF INVENTION

Technical Problem

When 80 degrees or more of apparent field of view is attained and a sufficient eye relief is secured, the focal length of the positive lens group on the viewer's eye side is required to be long to some extent. Therefore, the focal length of the negative lens component on the object side is configured to be several times (approximately 4 times or less) as large in absolute value as the focal length of the positive lens component on the viewer's eye side in order to be advantageous to the curvature of field and the like. Thereby, the aberrations can be suppressed from deteriorating. However, this technique causes the diameter of the positive lens component on the viewer's eye side to increase due to dispersion action of the negative lens component on the object side, this impairing compactness and being insufficient for correction of the aberrations in a portion of the periphery of the visual field, and only allowing up to approximately 60 degrees of apparent field of view to be operable. This tendency is more significant for longer overall focal length of the ocular lens.

The present invention is devised in view of such a problem and an object thereof is to provide an ocular lens in which aberrations are favorably corrected across a sufficiently wide angle of view and a lens diameter is suppressed from increasing with a sufficient eye relief attained and without a total length being long, and an optical apparatus including the ocular lens.

Solution to Problem

In order to solve the above-mentioned problem, an ocular lens according to the present invention includes: in order from an object side, a first lens group; a second lens group; and a third lens group having positive refractive power, wherein the first lens group has, in order from the object side, a first lens component having negative refractive power in a shape having a concave surface facing a viewer's eye side, a second lens component in a meniscus shape having a convex surface facing the object side, and a third lens component having positive refractive power, the second lens group has a lens component having a convex surface facing the viewer's eye side, an object side focal plane of the third lens group is positioned between the second lens group and the third lens group, and a condition in the following expression is satisfied:

$$6 \leq |f1/f|$$

where $f$ denotes an overall focal length, and $f1$ denotes a focal length of the first lens group.

In the ocular lens as above, it is preferable that a condition in the following expression is satisfied:

$$1.2 \leq |G1ARf/G1ARr|$$

where $G1ARf$ denotes a radius of curvature of a surface on the object side of the first lens component included in the first lens group, and $G1ARr$ denotes a radius of curvature of a surface on the viewer's eye side of the first lens component included in the first lens group.

Moreover, in the ocular lens as above, it is preferable that the first lens component included in the first lens group has negative refractive power, and a condition in the following expression is satisfied:

$$-7 \leq f1A/f \leq -2$$

where $f1A$ denotes a focal length of the first lens component.

Moreover, in the ocular lens as above, it is preferable that a condition in the following expression is satisfied:

$$6 \leq |f12/f|$$

where $f12$ denotes a combined focal length of the first lens group and the second lens group.

Moreover, in the ocular lens as above, it is preferable that a condition in the following expression is satisfied:

$$0.7 \leq f3/f \leq 1.5$$

where $f3$ denotes a focal length of the third lens group.

Moreover, in the ocular lens as above, it is preferable that a condition in the following expression is satisfied:

$$5 \leq |f2/f|$$

where $f2$ denotes a focal length of the second lens group.

Moreover, in the ocular lens as above, it is preferable that the second lens component included in the first lens group is a cemented lens, and a condition of the following expression is satisfied:

$$1.5 \leq G1BRf/(d11/n11 + d12/n12) \leq 5$$

where G1BRf denotes a radius of curvature of a surface, of the second lens component, that is closest to the object side, d11 denotes an on-axis distance of a lens which constitutes the cemented lens and is on the object side, n11 denotes a refractive index of a medium of the lens on the object side at a d line, d12 denotes an on-axis distance of a lens which constitutes the cemented lens and is on the viewer's eye side, and n12 denotes a refractive index of a medium of the lens on the viewer's eye side at the d line.

Moreover, in the ocular lens as above, it is preferable that a condition in the following expression is satisfied:

$$0.6 \leq G1BRr/f \leq 1.8$$

where G1BRr denotes a radius of curvature of a surface, of the second lens component included in the first lens group, that is closest to the viewer's eye side.

Moreover, in the ocular lens as above, it is preferable that the first lens component included in the first lens group is in a biconcave shape.

Moreover, in the ocular lens as above, it is preferable that the third lens component included in the first lens group is a cemented lens.

Moreover, in the ocular lens as above, it is preferable that a condition in the following expression is satisfied:

$$0.5 \leq D/f \leq 2$$

where D denotes an on-axis air space between the second lens group and the third lens group.

Moreover, in the ocular lens as above, it is preferable that the second lens group is constituted of a lens component in a meniscus shape having a convex surface facing the viewer's eye side.

Moreover, in the ocular lens as above, it is preferable that at least one surface of the surfaces of the lenses included in the first lens group, the second lens group and the third lens group is in an aspheric shape.

Moreover, an optical apparatus according to the present invention includes any of the above-mentioned ocular lenses.

Advantageous Effects of Invention

Implementing the present invention as above can provide an ocular lens in which aberrations are favorably corrected across a sufficiently wide angle of view and a lens diameter is suppressed from increasing with a sufficient eye relief attained and without a total length being long, and an optical apparatus including the ocular lens.

DESCRIPTION OF EMBODIMENTS

Figure 1:
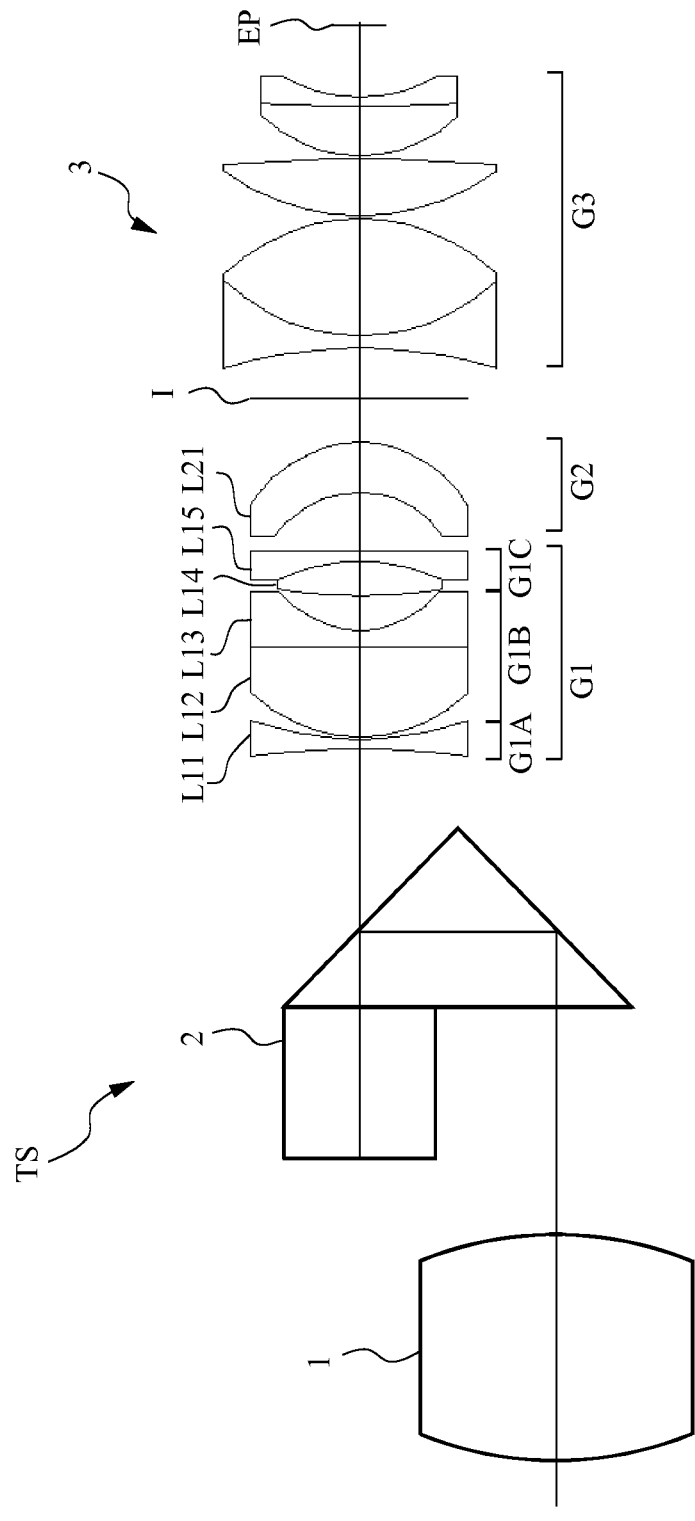
FIG. 1 is an explanatory drawing illustrating a configuration of an optical apparatus including an ocular lens.

Hereafter, a preferred embodiment of the present invention are described with reference to the drawings. First, as an optical apparatus having an ocular lens according to the embodiment, a configuration of a telescope optical system TS illustrated in FIG. 1 is described. The telescope optical system TS is configured to have, in order from the observed object side, an objective lens 1, an erecting prism 2, and an ocular lens 3. The erecting prism 2 is disposed between the objective lens 1 and the ocular lens 3 and causes the inverted image of the observed object formed by the objective lens 1 to be inverted vertically and horizontally. As the erecting prism 2, for example, a so-called Porro prism constituted of two isosceles triangular prisms can be used. The image of the observed object formed by the objective lens 1 can be magnified and observed by the viewer's eye positioned at an eye point EP using the ocular lens 3. Notably, the telescope optical system TS illustrated in FIG. 1 is simply exemplary and not limited to the configuration illustrated in FIG. 1. For example, in an astronomical telescope or the like, the erecting prism 2 is not necessary, and in this case, the erecting prism 2 does not necessarily have to be included.

The ocular lens 3 according to the embodiment is configured to have, in order from the object side, a first lens group G1, a second lens group G2, and a third lens group G3 having positive refractive power. Moreover, the first lens group G1 is configured to have, in order from the object side, a first lens component G1A having negative refractive power and having a concave surface facing the viewer's eye side, a second lens component G1B in a meniscus shape having a convex surface facing the object side, and a third lens component G1C having positive refractive power, and the second lens group G2 is configured to have a lens component having a convex surface facing the viewer's eye side. Moreover, in the ocular lens 3, an object side focal plane I of the third lens group G3 is positioned between the second lens group G2 and the third lens group G3. Notably, "lens component" designates a single lens or a cemented lens having two or more single lenses cemented.

Next, conditions for configuring the ocular lens 3 according to the embodiment are described. First, the ocular lens 3 according to the embodiment preferably satisfies the following conditional expression (1), where f denotes the overall focal length, and f1 denotes a focal length of the first lens group G1.

$$6 \leq |f1/f| \qquad (1)$$

Conditional expression (1) defines the ratio of the focal length f1 of the first lens group G1 to the overall focal length f of the ocular lens 3. Shortage to the lower limit value in conditional expression (1) in the case where the refractive power of the first lens group G1 is positive causes the positive refractive power to be large and the Petzval sum to increase, this causing correction of the curvature of field and the astigmatism not to be able to be sufficiently performed. Moreover, shortage to the lower limit value in conditional expression (1) in the case where the refractive power of the first lens group G1 is negative causes the negative refractive power to be large and dispersion action on the first lens group G1 to be too strong, which undesirably causes the diameter of the third lens group G3 to increase. Notably, in order to secure the effects of the configuration, the lower limit value in conditional expression (1) is preferably 10. Moreover, still preferably, the lower limit value in conditional expression (1) is 15, which allows more excellent results to be attained.

Moreover, the ocular lens 3 according to the embodiment preferably satisfies the following conditional expression (2), where G1ARf denotes a radius of curvature of the surface on the object side of the first lens component G1A included in the first lens group G1, and G1ARr denotes a radius of curvature of the surface on the viewer's eye side thereof.

$$1.2 \leq |G1ARf/G1ARr| \qquad (2)$$

Conditional expression (2) defines the shape of the first lens component G1A included in the first lens group G1. First, the effect of making the first lens component G1A a lens component having negative refractive power is described.

Typically, the ocular lens 3 observes the image obtained by the objective lens 1. In an erecting optical system such as binoculars, as illustrated in FIG. 1, the erecting prism 2 is disposed between the objective lens 1 and the ocular lens 3. Moreover, in an inverted optical system such as an astronomical telescope, while the erecting prism 2 is not used, there is sometimes a case where a prism or the like for changing the observation direction is inserted in front of the ocular lens 3.

The ocular lens 3, as presented in the embodiment, that has the configuration in which lens groups are disposed on both sides of the intermediate image is preferable when the substantial tip position of the ocular lens 3 is apart from the objective lens 1 as much as possible relative to the position of the image formed by the objective lens 1 in observation, because it does not interfere with the above-mentioned prism or the like (for example, the erecting prism 2). In the embodiment, as the first lens component G1A, a lens component having negative refractive power is disposed, and thereby, the position of the lens that is closest to the object side in the optical system constituting the ocular lens 3 can be disposed to be as apart from the objective lens 1 as possible relative to the position of the image of the objective lens 1 in observation. Hence, spacing can be substantially secured in front of the ocular lens 3. Furthermore, the first lens component G1A is a lens component having negative refractive power. Hence, the Petzval sum can be made small, which allows advantageous effects on the curvature of field and the like.

Moreover, conditional expression (2) above is satisfied, and thereby, aberrations on the peripheral light flux arising due to the first lens component G1A can be suppressed from deteriorating. Notably, in order to secure the effects of the configuration, the lower limit value in conditional expression (2) is preferably 1.35. Moreover, still preferably, the lower limit value in conditional expression (2) is 1.5, which allows more excellent results to be attained. Furthermore, as a preferable shape of the first lens component G1A, a biconcave lens is preferable because it can suppress aberrations on the peripheral light flux from deteriorating.

Moreover, the ocular lens 3 according to the embodiment preferably satisfies the following conditional expression (3), where f denotes the overall focal length, the first lens component G1A included in the first lens group G1 has negative refractive power, and f1A denotes a focal length of the first lens component G1A.

$$-7 \leq f1A/f \leq -2 \qquad (3)$$

Conditional expression (3) defines the ratio of the focal length f1A of the first lens component G1A to the overall focal length f of the ocular lens 3. Conditional expression (3) is satisfied, and thereby, the above-mentioned effect of the lens component having negative refractive power like the first lens component G1A can be attained while the aberrations are suppressed from deteriorating. Shortage to the lower limit value in conditional expression (3) causes the effect of negative refractive power to be small, the effect of correction of the curvature of field not to be able to be sufficiently attained, and the spacing in front of the ocular lens 3 not to be able to be sufficiently secured. Notably, in order to secure the effects of the configuration, the lower limit value in conditional expression (3) is preferably −6. Moreover, still preferably, the lower limit value in conditional expression (3) is −5, which allows more excellent results to be attained. Moreover, excess over the upper limit value in conditional expression (3) causes the dispersion action due to the negative refractive power to be too large, which undesirably causes the diameters of the following lens groups to increase and aberrations on the peripheral light flux to deteriorate. Notably, in order to secure the effects of the configuration, the upper limit value in conditional expression (3) is preferably −2.4. Moreover, still preferably, the upper limit value in conditional expression (3) is −2.8, which allows more excellent results to be attained.

Moreover, the ocular lens 3 according to the embodiment preferably satisfies the following conditional expression (4), where f denotes the overall focal length, f12 denotes a combined focal length of the first lens group G1 and the second lens group G2.

$$6 \leq |f12/f| \qquad (4)$$

Conditional expression (4) defines the ratio of the combined focal length f12 of the first lens group G1 and the second lens group G2 to the overall focal length f of the ocular lens 3. Shortage to the lower limit value in conditional expression (4) when the combined refractive power of the first lens group G1 and the second lens group G2 is positive causes the positive refractive power to be large, the Petzval sum to increase, and correction of the curvature of field and the astigmatism not to be able to be sufficiently performed. Moreover, shortage to the lower limit value in conditional expression (4) when the combined refractive power of the first lens group G1 and the second lens group G2 is negative causes the negative refractive power to be large, and thus, the dispersion action at the first and second lens groups G1 and G2 to be too strong, which undesirably causes the diameter of the third lens group G3 to increase. Notably, in order to secure the effects of the configuration, the lower limit value in conditional expression (4) is preferably 7.3. Moreover, still preferably, the lower limit value in conditional expression (4) is 8.3, which allows more excellent results to be attained.

Moreover, the ocular lens 3 according to the embodiment preferably satisfies the following conditional expression (5), where f denotes the overall focal length, and f3 denotes a focal length of the third lens group G3.

$$0.7 \leq f3/f \leq 1.5 \qquad (5)$$

Conditional expression (5) defines the ratio of the focal length f3 of the third lens group G3 to the overall focal length f of the ocular lens 3. Generally, the eye relief of the ocular lens largely depends on the focal length of the positive lens component on the viewer's eye side rather than on the field stop. When an eye relief with sufficient length is secured while the aberrations in a portion of the periphery of the visual field are corrected at 80 degrees or more of apparent field of view, the focal length of the positive lens component on the viewer's eye side needs be long to some extent. The reason is that at least approximately 5 lenses are required when sufficient aberration correction is performed across a wide angle of view, and that increase in lens diameter caused by the wide field of view also causes the central thickness of the lens to increase and the eye relief to be less liable to appear compared with a typical ocular lens with approximately 50 degrees to 60 degrees of apparent field of view.

Shortage to the lower limit value in conditional expression (5) undesirably causes a sufficient eye relief not to be able to be secured. Notably, in order to secure the effects of the configuration, the lower limit value in conditional expression (5) is preferably 0.8. Moreover, still preferably, the lower limit value in conditional expression (5) is 0.9, which allows more excellent results to be attained. Conversely, excess over the upper limit value in conditional expression (5) undesirably causes the lens diameter of the third lens group G3 to increase. Notably, in order to secure the effects of the configuration, the upper limit value in conditional expression (5) is preferably 1.4. Moreover, still preferably, the upper limit value in conditional expression (5) is 1.35, which allows more excellent results to be attained.

Next, the effects of the second lens group G2 are described. The ocular lens 3 according to the embodiment preferably satisfies the following conditional expression (6), where f denotes the overall focal length, and f2 denotes a focal length of the second lens group G2.

$$5 \leq |f2/f| \quad (6)$$

Conditional expression (6) defines the ratio of the focal length f2 of the second lens group G2 to the overall focal length f of the ocular lens 3. The ocular lens 3 according to the embodiment satisfies conditional expression (6) above, and thereby, attains the effect of suppressing the lens diameter of the third lens group G3 from increasing and the effect of reducing the Petzval sum.

First, defining the focal length f2 of the second lens group G2 is described. The ocular lens 3 according to the embodiment exemplarily targets to allow the lens diameter, specifically, the lens diameter of the third lens group G3 not to be large while securing a wide apparent field of view. To this end, the second lens group G2 is configured as a lens component having a positive focal length, this enabling the position of the light flux incident on the third lens group G3 to be low, since the light flux dispersed at the first lens group G1 can be refracted in orientation to the optical axis.

However, the second lens group G2 having positive refractive power may cause an increase in the Petzval sum. Therefore, the shape of a lens component constituting the second lens group G2 is configured to be a shape having a convex surface facing the viewer's eye side, preferably, a meniscus shape. Thereby, the effect of reducing the Petzval sum can be attained. The reason is that the concave surface, of the meniscus shape, allowed to have negative refractive power can realize the Galilean system, which has the effect of reducing the Petzval sum. The larger the negative refractive power of this surface is configured to be, the more the effect of reducing the Petzval sum can be increased. Moreover, the convex surface allowed to face the viewer's eye side can largely shift the position of the principal point of the second lens group G2 toward the viewer's eye side, this also allowing the effect of suppressing the overall length of the ocular lens 3 to be attained.

Note that there is a case where the focal length of the second lens group G2 does not necessarily have to be positive. For example, it is the case where the lens diameter of the third lens group G3 does not necessarily have to be quite small. Generally, in the case of observation with both the right and left eyes using binoculars or the like, the interpupillary distance (distance between the right and left pupils) of the human is what matters. The interpupillary distance of the human is typically approximately 60 mm to 70 mm. Hence, the distance between the optical axes of the right and left ocular lenses is required to be 60 mm or more, and the barrel diameters of the ocular lenses also needs to be prepared so as to meet this condition.

Meanwhile, in the case of monocular observation using a telescope or the like, the interpupillary distance does not necessarily have to be taken into consideration. Hence, the barrel diameter can be large as long as it does not cause a practical problem. Accordingly, there is sometimes also a case where the lens diameter of the third lens group G3 does not necessarily have to be quite small due to the positive lens action of the second lens group G2. In this case, when the meniscus-shaped lens component is configured to have an optimum shape with the aberrations maintained to be balanced, the focal length of the second lens group G2 is not limited to be positive but may have no refractive power (power) or may be configured to be negative.

Nevertheless, at the apparent field of view of 80 degrees or more, correction of the curvature of field and the astigmatism in a portion of the periphery of the visual field caused by increase in the lens diameter of the third lens group G3 is difficult. Hence, the negative refractive power needs be suppressed within conditional expression (6). The ocular lens 3 according to the embodiment satisfies conditional expression (6), this enabling the lens diameter of the third lens group G3 to be suppressed from increasing while the Petzval sum is prevented from increasing.

Herein, when the second lens group G2 has positive refractive power, shortage to the lower limit value in conditional expression (6) undesirably causes the Petzval sum to be large and correction of the curvature of field and the like not to be able to be sufficiently performed. On the other hand, when the second lens group G2 has negative refractive power, shortage to the lower limit value in conditional expression (6) undesirably causes the dispersion action at the second lens group G2 to be large, the lens diameter of the third lens group G3 to increase, and correction of the aberrations in a portion of the periphery of the visual field to be difficult. Notably, in order to secure the effects of the configuration, the lower limit value in conditional expression (6) is preferably 6. Moreover, still preferably, the lower limit value in conditional expression (6) is 7, which allows more excellent results to be attained.

Moreover, in the ocular lens 3 according to the embodiment as above, the second lens component G1B included in the first lens group G1 is a cemented lens and the following conditional expression (7) is preferably satisfied, where G1BRf denotes a radius of curvature of the surface, of the second lens component G1B, that is closest to the object side (for example, the surface of a plano-convex lens L12 on the object side in FIG. 1 (third surface)), d11 denotes an on-axis distance of the lens constituting the cemented lens on the object side (for example, the plano-convex lens L12 in FIG. 1), n11 denotes a refractive index of the medium of the lens on the object side at a d line, d12 denotes an on-axis distance of the lens constituting the cemented lens on the viewer's eye side (for example, a plano-concave lens L13 in FIG. 1), and n12 denotes a refractive index of the medium of the lens on the viewer's eye side at the d line.

$$1.5 \leq G1BRf/(d11/n11 + d12/n12) \leq 5 \quad (7)$$

Moreover, the ocular lens 3 according to the embodiment preferably satisfies the following conditional expression (8), where f denotes the overall focal length, and G1BRr denotes a radius of curvature of the surface, of the second lens component G1B included in the first lens group G1, that is closest to the viewer's eye side (for example, the surface of the plano-concave lens L13 in FIG. 1 on the viewer's eye side (fifth surface)).

$$0.6 \le G1BRr/f \le 1.8 \quad (8)$$

Conditional expression (7) and conditional expression (8) define the shape of the second lens component G1B included in the first lens group G1. Conditional expression (7) is satisfied, this enabling the light flux which is in a portion of the periphery of the visual field and incident on the ocular lens 3 to be put downward in orientation to the optical axis and this also enabling the diameters of the following lenses to be suppressed from increasing.

However, since the shape for putting the light flux downward has a convex surface facing the object side and means that it has positive refractive power, this is disadvantageous to the Petzval sum. Therefore, conditional expression (8) is satisfied, this enabling the Petzval sum to be suppressed from increasing. Conditional expression (8) above defines the radius of curvature of the surface of the second lens component G1B on the viewer's eye side. Conditional expression (8) is satisfied, and thereby, this surface can be given negative refractive power. Conditional expression (7) and conditional expression (8) are satisfied, and thereby, the second lens component G1B is in a meniscus shape having a convex surface facing the object side and can be configured as the Galilean system, which has the effect of reducing the Petzval sum.

Shortage to the lower limit value in conditional expression (7) undesirably causes large refraction action and the aberrations in a portion of the periphery of the visual field to deteriorate. Notably, in order to secure the effects of the configuration, the lower limit value in conditional expression (7) is preferably 2. Moreover, still preferably, the lower limit value in conditional expression (7) is 2.3, which allows more excellent results to be attained. Conversely, excess over the upper limit value in conditional expression (7) undesirably causes the effect of reducing the height of the light flux in a portion of the periphery of the visual field not to be able to be attained and the diameters of the following lenses to increase. Notably, in order to secure the effects of the configuration, the upper limit value in conditional expression (7) is preferably 4. Moreover, still preferably, the upper limit value in conditional expression (7) is 3.5, which allows more excellent results to be attained.

Moreover, shortage to the lower limit value in conditional expression (8) causes the negative refractive power on the surface of the second lens component G1B on the viewer's eye side to be large, which undesirably causes the dispersion action to be too large, the aberrations of the light flux in the periphery of the visual field to deteriorate, and the diameters on the following lenses to increase. Notably, in order to secure the effects of the configuration, the lower limit value in conditional expression (8) is preferably 0.7. Moreover, still preferably, the lower limit value in conditional expression (8) is 0.8, which allows more excellent results to be attained. Conversely, excess over the upper limit value in conditional expression (8) causes the negative refractive power of the surface on the viewer's eye side to be small, this causing the effect of suppressing the Petzval sum from increasing not to be attained, and correction of the curvature of field and the like not to be able to be sufficiently satisfied. Notably, in order to secure the effects of the configuration, the upper limit value in conditional expression (8) is preferably 1.7. Moreover, still preferably, the upper limit value in conditional expression (8) is 1.4, which allows more excellent results to be attained.

Moreover, in the ocular lens 3 as above, the second lens component G1B and the third lens component G1C included in the first lens group G1 are preferably cemented lenses. Configuring these lens components as cemented ones enables the longitudinal chromatic aberration and the lateral chromatic aberration of the peripheral light flux to be favorably corrected. In particular, in photographing or the like, when the chromatic aberration across a wide wavelength band is wanted to be corrected, the correction of these chromatic aberrations is important. Herein, when the lens group closer to the object side, in other words, the lens at the closer position to the objective lens 1 is configured as a cemented one, the longitudinal chromatic aberration is easier to be controlled. Moreover, the wider the field of view becomes, the more difficult the correction of the lateral chromatic aberration in a portion of the periphery of the visual field becomes. Therefore, configuring the second lens component G1B and the third lens component G1C as cemented lenses enables the longitudinal chromatic aberration and the lateral chromatic aberration in a portion of the periphery of the visual field to be favorably corrected. By doing so, the correction of the chromatic aberrations can be shared by the second lens component G1B and the third lens component G1C, this enabling the longitudinal chromatic aberration and the lateral chromatic aberration to be corrected simultaneously even across a wide field of view, and the astigmatism, the coma aberration and the like in a portion of the periphery of the visual field to be suppressed from arising. Improving the longitudinal chromatic aberration brings a sharp image without color halation in a portion of the center of the visual field also in terms of ocular viewing performance in the nature of things.

Moreover, the ocular lens 3 according to the embodiment preferably satisfies the following conditional expression (9), where f denotes the overall focal length, and D denotes an on-axis air space between the second lens group G2 and the third lens group G3.

$$0.5 \le D/f \le 2 \quad (9)$$

Conditional expression (9) defines the on-axis air space D between the second lens group G2 and the third lens group G3. Conditional expression (9) above is satisfied, this enabling the aberrations to be favorably corrected and the total length of the ocular lens 3 to be maintained to be compact. Configuring the space between the second lens group G2 and the third lens group G3 to be wide is advantageous to correction of the aberrations. However, the wide space causes the total length to be long, this impairing the compactness. This influence causes inconvenience, for example, of imbalance of the portion of the ocular lens to be too heavy in the case of its attachment to a telescope.

Shortage to the lower limit value in conditional expression (9) causes the space between the second lens group G2 and the third lens group G3 to be narrow and the position of the intermediate image plane to be close to the lens surface, which undesirably causes a concern that scratches or dusts on the lens surface may be seen in observation, and the aberrations caused by the drastic refraction action on the light flux in the periphery of the visual field due to the second lens group G2 to deteriorate. Notably, in order to secure the effects of the configuration, the lower limit value in conditional expression (9) is preferably 0.6. Moreover, still preferably, the lower limit value in conditional expression (9) is 0.7, which allows more excellent results to be attained. Moreover, excess over the upper limit value in conditional expression (9) undesirably impairs the compactness and causes the weight to increase. Notably, in order to secure the effects of the configuration, the upper limit value in conditional expression (9) is preferably 1.5. Moreover, still preferably, the upper limit value in conditional expression (9) is 1.2, this enabling the ocular lens 3 that is compact and excellent in regard to the aberrations to be provided.

Moreover, in the ocular lens 3 according to the embodiment, at least one surface of the lens surfaces of the lenses included in the each of the lens groups G1 to G3 preferably has an aspheric shape. This exceedingly increases flexibility in controlling the distortion, and thus, is effective for correcting the astigmatism in a portion of the periphery of the visual field.

In this way, configuring the ocular lens 3 according to the embodiment as above enables the aberrations to be favorably corrected across a sufficiently wide angle of view, a sufficient eye relief to be given without the total length being long, and the lens diameter to be suppressed from increasing. Notably, in the description above, while a case where the ocular lens according to the embodiment is used for the telescope optical system TS is described, it can be used for a microscope optical system and the like.

EXAMPLES

Now, for the ocular lens as above, five examples are hereafter presented. FIG. 2, FIG. 4, FIG. 6, FIG. 8 and FIG. 10 are lens configurations of ocular lenses 3 according to first to fifth examples, respectively. As illustrated in FIG. 2, FIG. 4, FIG. 6, FIG. 8 and FIG. 10, each of the ocular lenses 3 according to the respective examples is constituted, in order from the object side, of a first lens group G1, a second lens group G2 having a lens component having a convex surface facing the viewer's eye side, and a third lens group G3 having positive refractive power. An object side focal plane I of the third lens group G3 is positioned between the second lens group G2 and the third lens group G3. Moreover, the first lens group G1 is constituted, in order from the object side, of a first lens component G1A, a second lens component G1B and a third lens component G1C.

First Example

Figure 2:
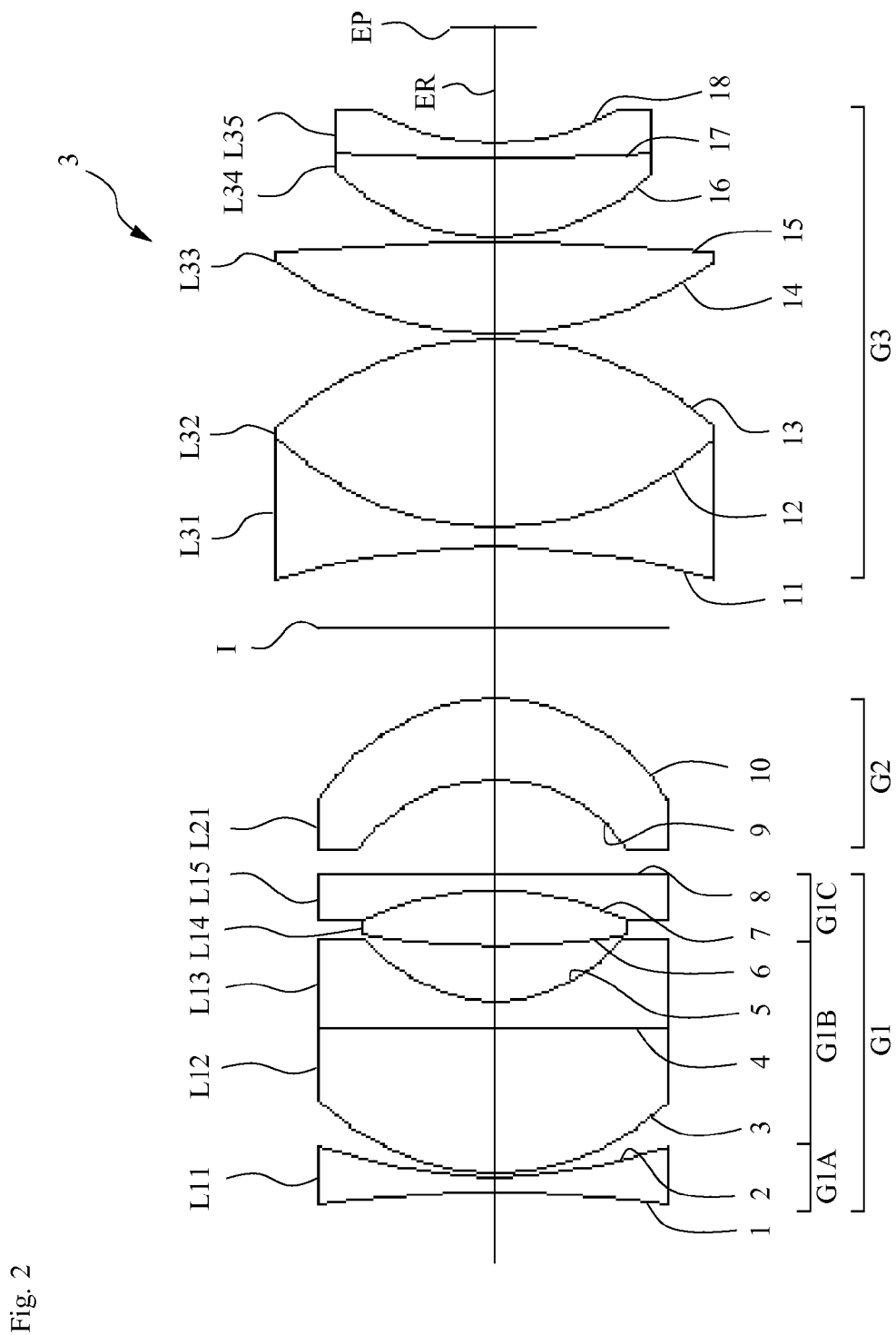
FIG. 2 is a lens configuration diagram illustrating a configuration of an ocular lens according to a first example.

FIG. 2 illustrates the ocular lens 3 according to the first example. In the ocular lens 3 according to the first example, the first lens component G1A included in the first lens group G1 is constituted of a biconcave lens L11 which is a lens component having negative refractive power in a shape having a concave surface facing the viewer's eye side, the second lens component G1B is constituted of a cemented lens which is in a meniscus shape having a convex surface facing the object side and constituted of a plano-convex lens L12 having a convex surface facing the object side and a plano-concave lens L13 having a concave surface facing the viewer's eye side, and the third lens component G1C is constituted of a cemented lens having positive refractive power constituted of a biconvex lens L14 and a plano-concave lens L15 having a concave surface facing the object side. Moreover, the second lens group G2 is constituted of a negative meniscus lens L21 having a convex surface facing the viewer's eye side. Furthermore, the third lens group G3 is constituted, in order from the object side, of a cemented lens constituted of a biconcave lens L31 and a biconvex lens L32, a biconvex lens L33, and a cemented lens constituted of a positive meniscus lens L34 having a convex surface facing the object side and a negative meniscus lens L35 having a convex surface facing the object side.

Table 1 below presents specifications of the ocular lens 3 according to the first example illustrated in FIG. 2. In Table 1, as the overall specifications presented here, f denotes the overall focal length of the ocular lens 3, f1 denotes the focal length of the first lens group G1, f2 denotes the focal length of the second lens group G2, f3 denotes the focal length of the third lens group G3, 2ω denotes the angle of view, and ER denotes the eye relief (a distance on the optical axis from the surface, of the ocular lens 3, that is closest to the viewer's eye side to the eye point EP). Moreover, as the lens data, m in the first column denotes the number of the optical surface in order from the object side (surface number), r in the second column denotes the radius of curvature of the optical surface, d in the third column denotes the distance on the optical axis from the optical surface to the next optical surface (inter-surface distance), nd in the fourth column denotes the refractive index at a d line (λ=587.6 nm), and vd in the fifth column denotes the Abbe number at the d line. Herein, the radius of curvature being 0.00 designates a plane. Moreover, the refractive index of the air, which is 1.000000, is omitted. Moreover, the surface numbers 1 to 18 presented in Table 1 correspond to the numbers 1 to 18 illustrated in FIG. 2. Moreover, Table 1 also presents the values regarding the ocular lens 3 corresponding to conditional expressions (1) to (9) above (values satisfying the conditions).

Herein, "mm" is generally used as the unit for the lengths of the radius of curvature r, the inter-surface distance d, the focal length f and the others described in all of the specifications below, unless otherwise noted. Nevertheless, the unit is not limited to "mm" and any other proper unit may be adopted since the optical system which is magnified proportionally or shrunk proportionally also attains the equivalent optical performance. Notably, the same holds true for the following examples in regard to the above-mentioned explanation for the table of the specifications.

TABLE 1

Overall Specifications f = 10
f1 = −461.5
f2 = 2353.8
f3 = 11.86
2ω = 100°
ER = 6.62

| | | Lens data | | |
|---|---|---|---|---|
| m | r | d | nd | vd |
| 1 | −86.74 | 0.90 | 1.517420 | 52.212 |
| 2 | 31.95 | 0.23 | | |
| 3 | 15.52 | 8.20 | 1.804200 | 46.486 |
| 4 | 0.00 | 1.60 | 1.749500 | 35.237 |
| 5 | 10.27 | 3.17 | | |
| 6 | 53.87 | 3.10 | 1.805180 | 25.432 |
| 7 | −19.63 | 0.90 | 1.497000 | 81.609 |
| 8 | 0.00 | 5.48 | | |
| 9 | −10.50 | 4.57 | 1.772500 | 49.615 |
| 10 | −12.42 | 8.64 | | |
| 11 | −47.94 | 1.15 | 1.805180 | 25.432 |
| 12 | 19.86 | 10.73 | 1.651600 | 58.597 |
| 13 | −19.86 | 0.23 | | |
| 14 | 23.28 | 5.25 | 1.804200 | 46.486 |
| 15 | −164.35 | 0.23 | | |
| 16 | 13.88 | 4.55 | 1.772500 | 49.615 |
| 17 | 137.00 | 0.91 | 1.761820 | 26.517 |
| 18 | 16.24 | (ER) | | |

Values Satisfying the Conditions f1A = −45.0
f12 = −714.4
(1) | f1/f | = 46.15
(2) | G1ARf/G1ARr | = 2.71
(3) f1A/f = −4.50

TABLE 1-continued (4) | f12/f | = 71.44
(5) f3/f = 1.19
(6) | f2/f | = 235.38
(7) G1BRf/(d11/n11 + d12/n1 2) = 2.84
(8) G1BRr/f = 1.03
(9) D/f = 0.86

As above, the ocular lens 3 according to the first example apparently satisfies all of conditional expressions (1) to (9) mentioned above.

Figure 3:
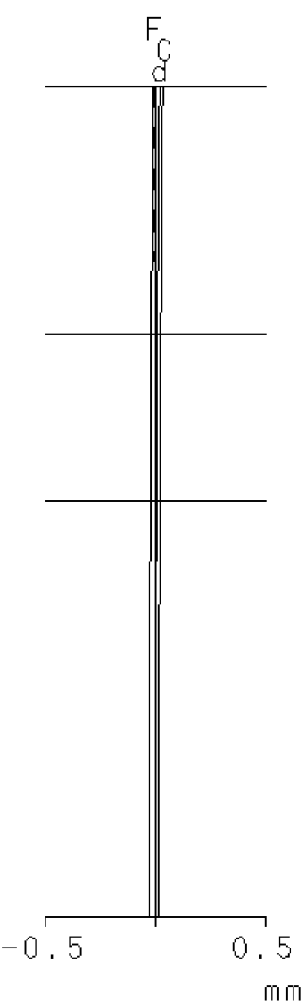
FIG. 3 is diagrams of aberrations in the first example.
Figure 3:
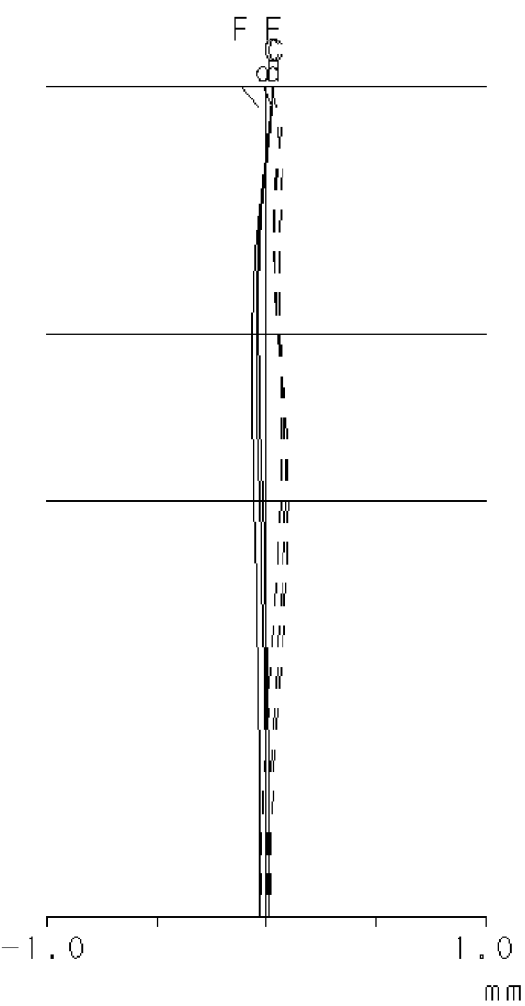

FIG. 3 illustrates diagrams of aberrations for the spherical aberrations and the astigmatisms of the ocular lens 3 according to the first example to rays at the d line, F line ($\lambda$=486.1 nm) and C line ($\lambda$=656.3 nm). Herein, the spherical aberrations are represented by the amounts of aberration to the F number FN. The astigmatisms are represented by the amounts of aberration to the angle of view $\omega$. Moreover, in the diagram of the astigmatisms, the solid lines designate the sagittal image planes to the individual wavelengths and the broken lines designate the meridional image planes to the individual wavelengths. Notably, the same holds true for the following examples in regard to the explanation for the diagrams of aberrations. As apparent from the diagrams of aberrations illustrated in FIG. 3 and the values in the above-mentioned table of the specifications, the ocular lens 3 according to the first example is found to have favorably corrected aberrations across a sufficiently wide angle of view, and have a sufficient eye relief attained without the total length being long while the increase in the lens diameter is suppressed.

Second Example

Figure 4:
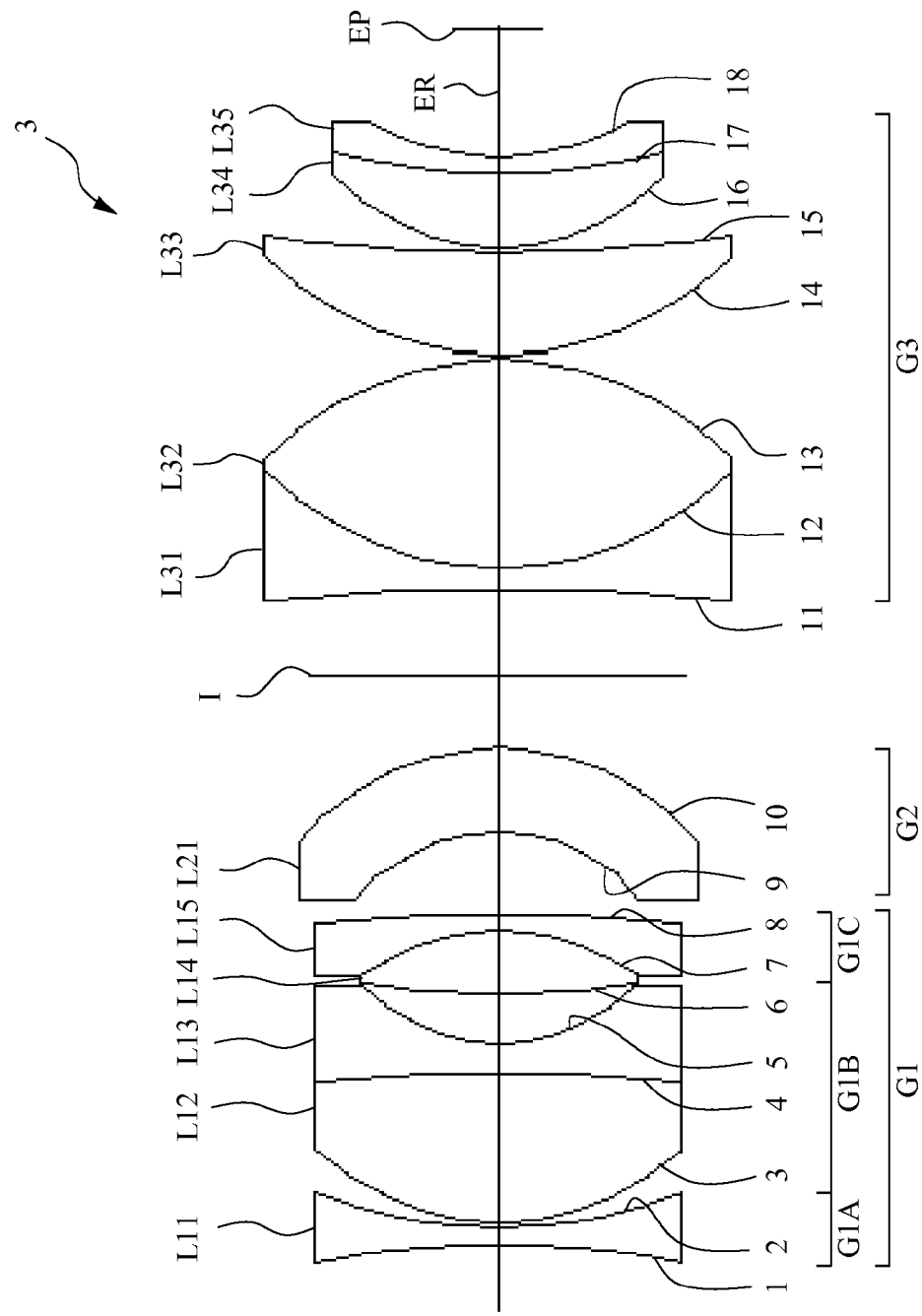
FIG. 4 is a lens configuration diagram illustrating a configuration of an ocular lens according to a second example.

FIG. 4 illustrates the ocular lens 3 according to the second example. In the ocular lens 3 according to the second example, the first lens component G1A included in the first lens group G1 is constituted of a biconcave lens L11 which is a lens component having negative refractive power in a shape having a concave surface facing the viewer's eye side, the second lens component G1B is constituted of a cemented lens which is in a meniscus shape having a convex surface facing the object side and constituted of a biconvex lens L12 and a biconcave lens L13, and the third lens component G1C is constituted of a cemented lens having positive refractive power constituted of a biconvex lens L14 and a negative meniscus lens L15 having a concave surface facing the object side. Moreover, the second lens group G2 is constituted of a negative meniscus lens L21 having a convex surface facing the viewer's eye side. Furthermore, the third lens group G3 is constituted, in order from the object side, of a cemented lens constituted of a biconcave lens L31 and a biconvex lens L32, a positive meniscus lens L33 having a convex surface facing the object side, and a cemented lens constituted of a positive meniscus lens L34 having a convex surface facing the object side and a negative meniscus lens L35 having a convex surface facing the object side.

Table 2 below presents specifications of the ocular lens 3 according to the second example illustrated in FIG. 4. Notably, the surface numbers 1 to 18 presented in Table 2 correspond to the numbers 1 to 18 illustrated in FIG. 4.

TABLE 2

Overall Specifications f = 10
f1 = 212.9
f2 = −87.8
f3 = 11.76
2$\omega$ = 100°
ER = 6.90

| Lens Data | | | | |
|---|---|---|---|---|
| m | r | d | nd | vd |
| 1 | −56.70 | 0.91 | 1.517420 | 52.212 |
| 2 | 28.85 | 0.23 | | |
| 3 | 15.54 | 8.20 | 1.804200 | 46.486 |
| 4 | −109.50 | 1.60 | 1.749500 | 35.237 |
| 5 | 11.00 | 2.75 | | |
| 6 | 57.24 | 3.40 | 1.805180 | 25.432 |
| 7 | −14.54 | 0.91 | 1.497000 | 81.609 |
| 8 | −135.75 | 4.55 | | |
| 9 | −11.00 | 4.55 | 1.772500 | 49.615 |
| 10 | −15.50 | 8.64 | | |
| 11 | −144.44 | 1.14 | 1.805180 | 25.432 |
| 12 | 19.63 | 11.40 | 1.651600 | 58.597 |
| 13 | −19.63 | 0.23 | | |
| 14 | 19.95 | 5.50 | 1.804200 | 46.486 |
| 15 | 104.59 | 0.23 | | |
| 16 | 13.26 | 4.10 | 1.772500 | 49.615 |
| 17 | 41.60 | 0.91 | 1.761820 | 26.517 |
| 18 | 16.50 | (ER) | | |

Values Satisfying the Conditions f1A = −36.8
f12 = −140.5
(1) | f1/f | = 21.29
(2) | G1ARf/G1ARr | = 1.97
(3) f1A/f = −3.68
(4) | f12/f | = 14.05
(5) f3/f = 1.18
(6) | f2/f | = 8.78
(7) G1BRf/(d11/n11 + d12/n12) = 2.85
(8) G1BRr/f = 1.10
(9) D/f = 0.86

Figure 5:
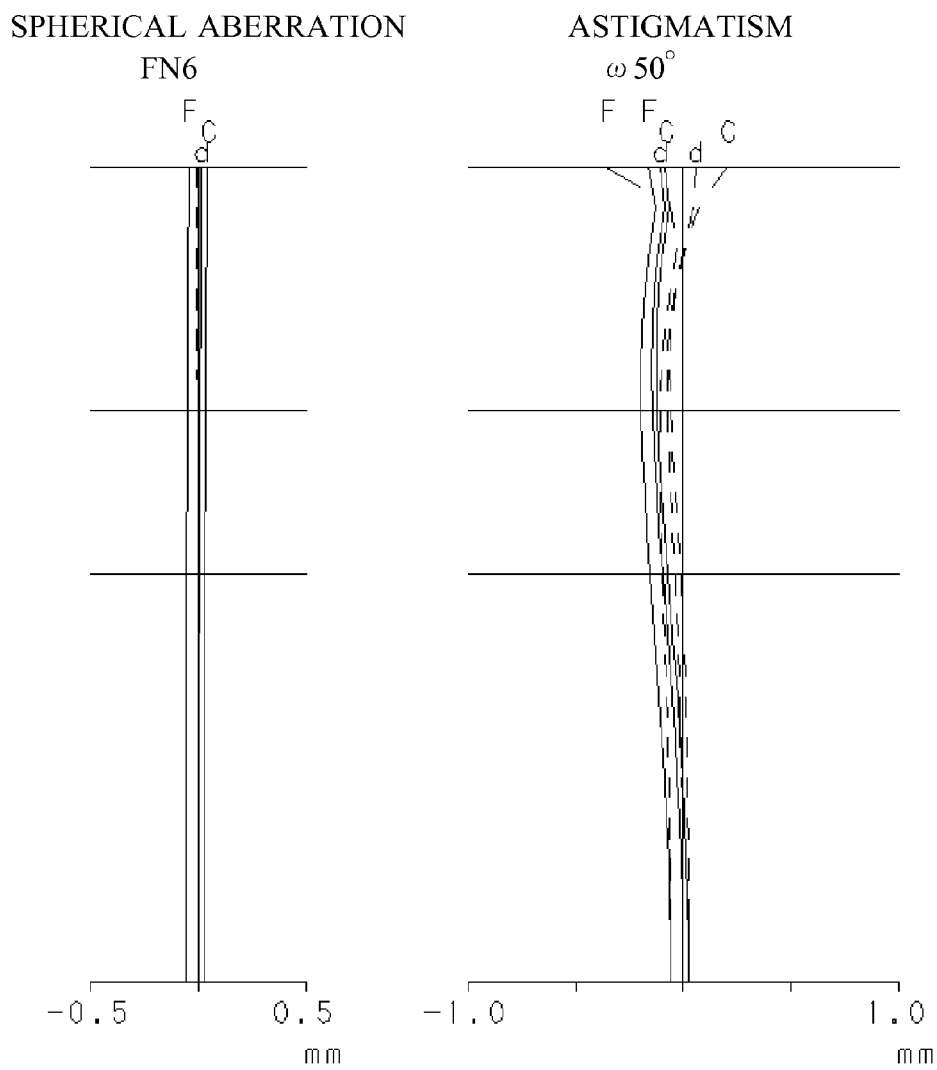
FIG. 5 is diagrams of aberrations in the second example.

As above, the ocular lens 3 according to the second example is apparently satisfies all of conditional expressions (1) to (9) mentioned above. Moreover, FIG. 5 illustrates diagrams of aberrations for the spherical aberrations and the astigmatisms of the ocular lens 3 according to the second example to the rays at the d line, F line and C line. As apparent from the diagrams of aberrations illustrated in FIG. 5 and the values in the above-mentioned table of the specifications, the ocular lens 3 according to the second example is found to have favorably corrected aberrations across a sufficiently wide angle of view, and have a sufficient eye relief attained without the total length being long while the increase in the lens diameter is suppressed.

Third Example

Figure 6:
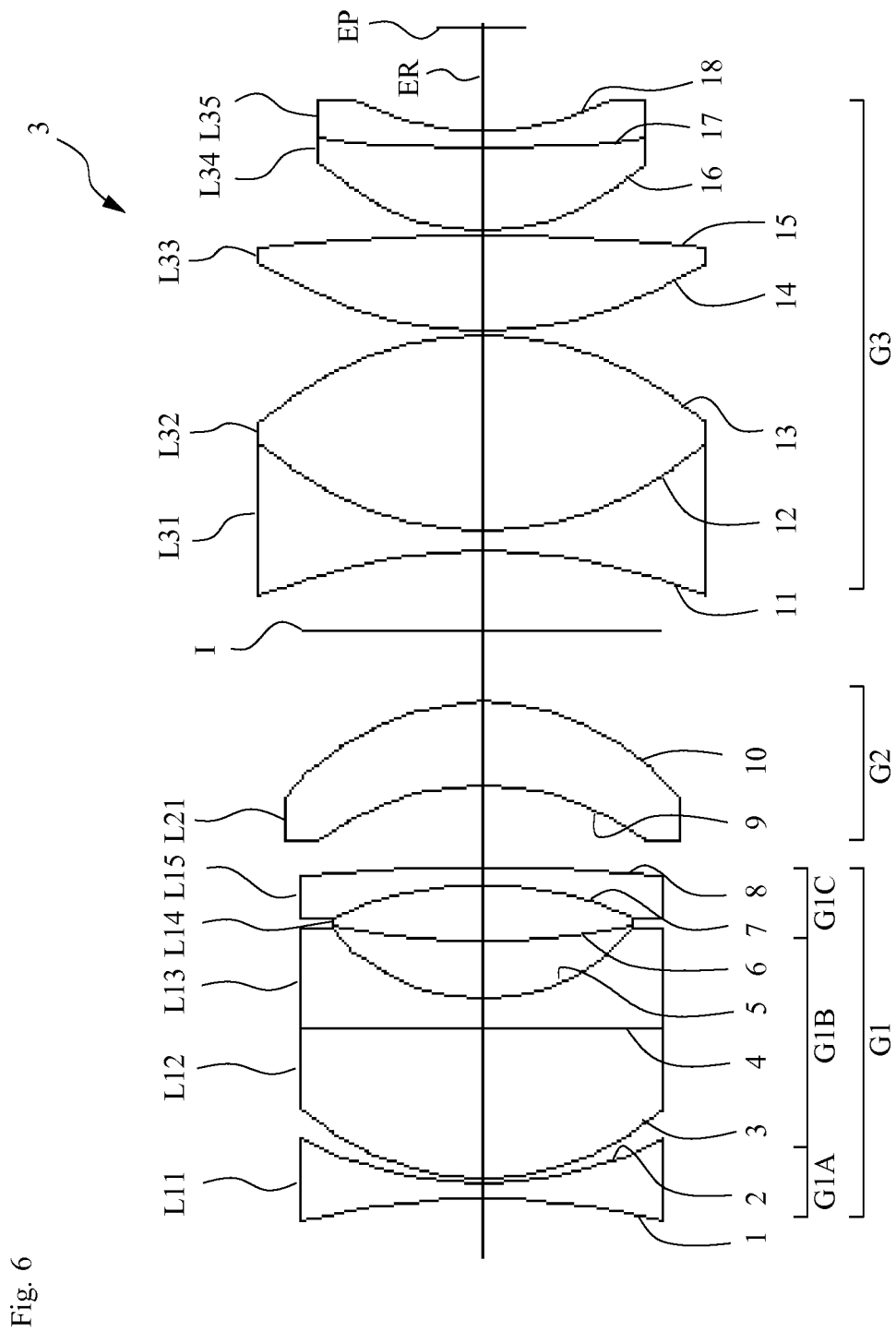
FIG. 6 is a lens configuration diagram illustrating a configuration of an ocular lens according to a third example.

FIG. 6 illustrates the ocular lens 3 according to the third example. In the ocular lens 3 according to the third example, the first lens component G1A included in the first lens group G1 is constituted of a biconcave lens L11 which is a lens component having negative refractive power in a shape having a concave surface facing the viewer's eye side, the second lens component G1B is constituted of a cemented lens which is in a meniscus shape having a convex surface facing the object side and constituted of a plano-convex lens L12 having a convex surface facing the object side and a plano-concave lens L13 having a concave surface facing the viewer's eye side, and the third lens component G1C is constituted of a cemented lens having positive refractive power constituted of a biconvex lens L14 and a negative meniscus lens L15 having a concave surface facing the object side. Moreover, the second lens group G2 is constituted of a negative meniscus lens L21 having a convex surface facing the viewer's eye side. Furthermore, the third lens group G3 is constituted, in order from the object side, of a cemented lens constituted of a biconcave lens L31 and a biconvex lens L32, a biconvex lens L33, and a cemented lens constituted of a positive meniscus lens L34 having a convex surface facing the object side and a negative meniscus lens L35 having a convex surface facing the object side.

Table 3 below presents specifications of the ocular lens 3 according to the third example illustrated in FIG. 6. Notably, the surface numbers 1 to 18 presented in Table 3 correspond to the numbers 1 to 18 illustrated in FIG. 6.

TABLE 3

Overall Specifications f = 10
f1 = −650.6
f2 = 95.6
f3 = 11.97
2ω = 98°
ER = 6.12

Lens data

| m | r | d | nd | vd |
|---|---|---|----|----|
| 1 | −45.41 | 0.91 | 1.517420 | 52.212 |
| 2 | 24.74 | 0.23 | | |
| 3 | 16.43 | 8.22 | 1.804200 | 46.486 |
| 4 | 0.00 | 1.60 | 1.749500 | 35.237 |
| 5 | 11.87 | 3.20 | | |
| 6 | 43.83 | 3.10 | 1.805180 | 25.432 |
| 7 | −21.91 | 0.91 | 1.497000 | 81.609 |
| 8 | −114.13 | 4.57 | | |
| 9 | −16.43 | 4.57 | 1.772500 | 49.615 |
| 10 | −15.07 | 8.29 | | |
| 11 | −35.84 | 1.14 | 1.805180 | 25.432 |
| 12 | 19.86 | 10.73 | 1.651600 | 58.597 |
| 13 | −19.86 | 0.23 | | |
| 14 | 24.42 | 5.25 | 1.804200 | 46.486 |
| 15 | −118.70 | 0.23 | | |
| 16 | 13.88 | 4.57 | 1.772500 | 49.615 |
| 17 | 95.87 | 0.91 | 1.761820 | 26.517 |
| 18 | 16.89 | (ER) | | |

Values Satisfying the Conditions f1A = −30.8
f12 = 98.43
(1) |f1/f| = 65.06
(2) |G1ARf/G1ARr| = 1.84
(3) f1A/f = −3.08
(4) |f12/f| = 9.84
(5) f3/f = 1.20
(6) |f2/f| = 9.56
(7) G1BRf/(d11/n11 + d12/n12) = 3.00
(8) G1BRr/f = 1.19
(9) D/f = 0.83

Figure 7:
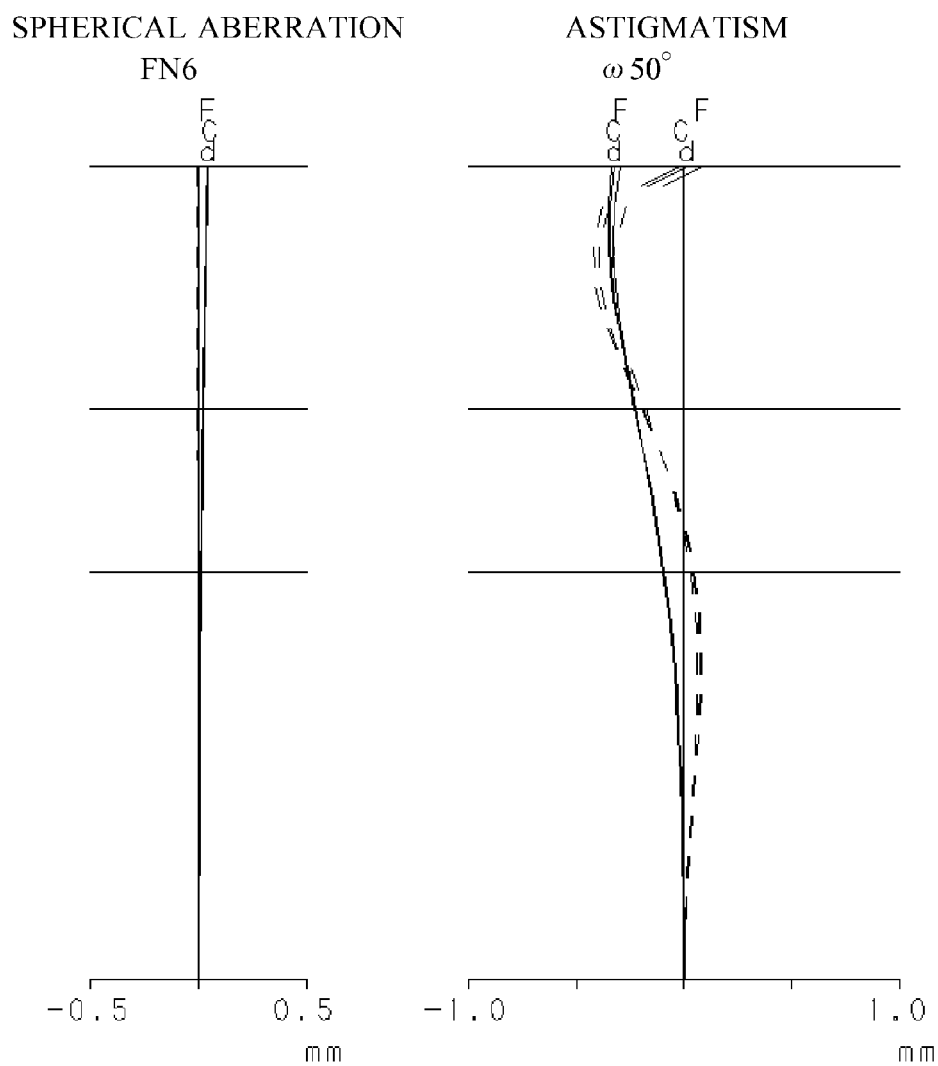
FIG. 7 is diagrams of aberrations in the third example.

As above, the ocular lens 3 according to the third example apparently satisfies all of conditional expressions (1) to (9) mentioned above. Moreover, FIG. 7 illustrates diagrams of aberrations for the spherical aberrations and the astigmatisms of the ocular lens 3 according to the third example to the rays at the d line, F line and C line. As apparent from the diagrams of aberrations illustrated in FIG. 7 and the values in the above-mentioned table of the specifications, the ocular lens 3 according to the third example is found to have favorably corrected aberrations across a sufficiently wide angle of view, and have a sufficient eye relief attained without the total length being long while the increase in the lens diameter is suppressed.

Fourth Example

Figure 8:
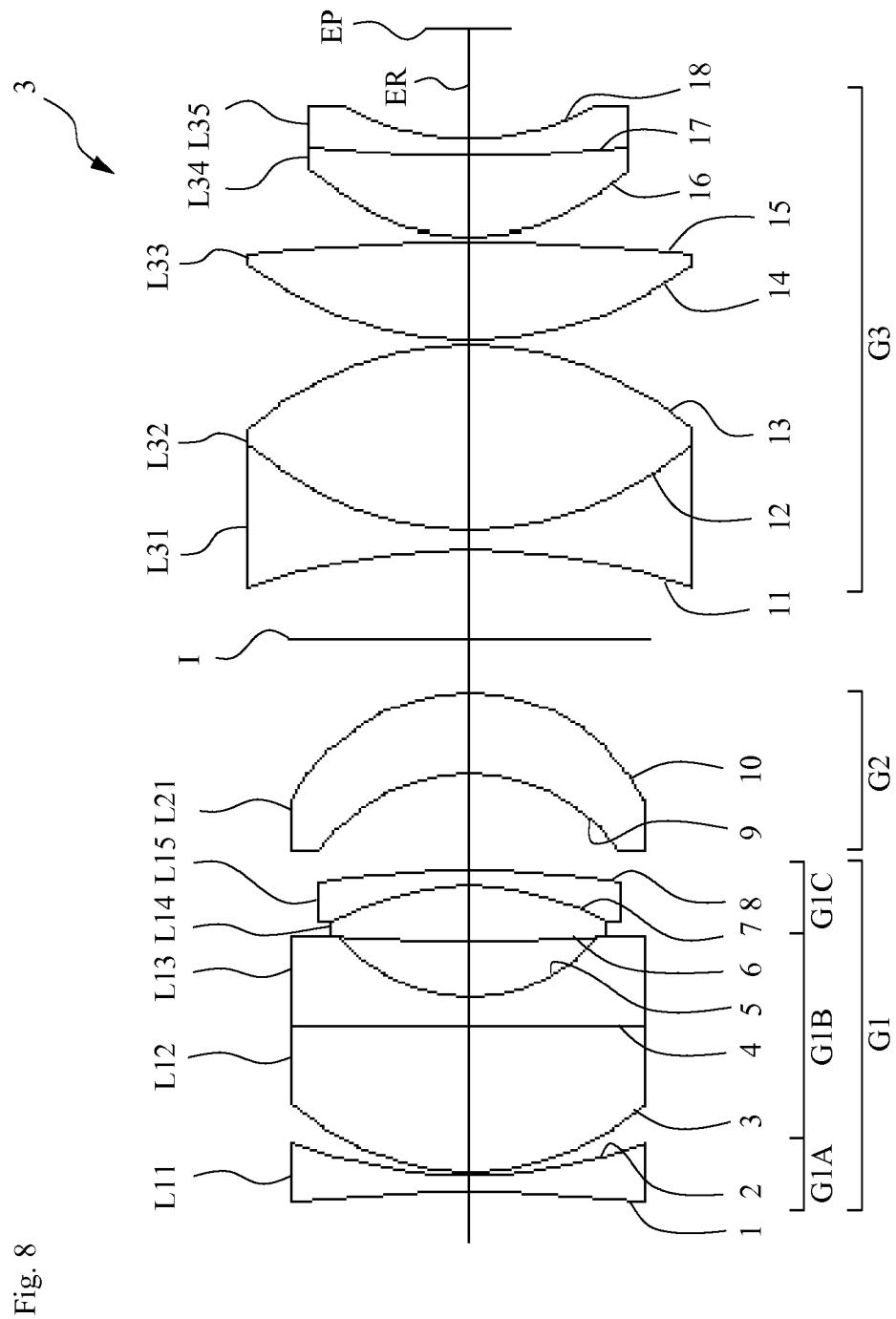
FIG. 8 is a lens configuration diagram illustrating a configuration of an ocular lens according to a fourth example.

FIG. 8 illustrates the ocular lens 3 according to the fourth example. In the ocular lens 3 according to the fourth example, the first lens component G1A included in the first lens group G1 is constituted of a biconcave lens L11 which is a lens component having negative refractive power in a shape having a concave surface facing the viewer's eye side, the second lens component G1B is constituted of a cemented lens which is in a meniscus shape having a convex surface facing the object side and constituted of a plano-convex lens L12 having a convex surface facing the object side and a plano-concave lens L13 having a concave surface facing the viewer's eye side, and the third lens component G1C is constituted of a cemented lens having positive refractive power constituted of a biconvex lens L14 and a negative meniscus lens L15 having a concave surface facing the object side. Moreover, the second lens group G2 is constituted of a negative meniscus lens L21 having a convex surface facing the viewer's eye side. Furthermore, the third lens group G3 is constituted, in order from the object side, of a cemented lens constituted of a biconcave lens L31 and a biconvex lens L32, a biconvex lens L33, and a cemented lens constituted of a positive meniscus lens L34 having a convex surface facing the object side and a negative meniscus lens L35 having a convex surface facing the object side.

Table 4 below presents specifications of the ocular lens 3 according to the fourth example illustrated in FIG. 8. Notably, the surface numbers 1 to 18 presented in Table 4 correspond to the numbers 1 to 18 illustrated in FIG. 8.

TABLE 4

Overall Specifications f = 10
f1 = −269.4
f2 = 139.4
f3 = 12.34
2ω = 96°
ER = 6.90

Lens Data

| m | r | d | nd | vd |
|---|---|---|----|----|
| 1 | −99.39 | 0.91 | 1.516800 | 63.881 |
| 2 | 29.78 | 0.23 | | |
| 3 | 16.48 | 8.22 | 1.804200 | 46.486 |
| 4 | 0.00 | 1.60 | 1.749500 | 35.237 |
| 5 | 10.42 | 3.20 | | |
| 6 | 114.91 | 3.10 | 1.805180 | 25.432 |
| 7 | −18.32 | 0.91 | 1.516800 | 63.881 |
| 8 | −60.87 | 5.48 | | |
| 9 | −11.40 | 4.57 | 1.772500 | 49.615 |
| 10 | −12.11 | 8.04 | | |
| 11 | −42.72 | 1.14 | 1.805180 | 25.432 |
| 12 | 20.54 | 10.50 | 1.651600 | 58.597 |
| 13 | −20.54 | 0.23 | | |
| 14 | 23.12 | 5.48 | 1.772500 | 49.615 |
| 15 | −134.21 | 0.23 | | |
| 16 | 13.88 | 4.57 | 1.772500 | 49.615 |
| 17 | 103.10 | 0.91 | 1.761820 | 26.517 |
| 18 | 16.11 | (ER) | | |

Values Satisfying the Conditions f1A = −44.2
f12 = 224.57
(1) |f1/f| = 26.94
(2) |G1ARf/G1ARr| = 3.34
(3) f1A/f = −4.42
(4) |f12/f| = 22.46
(5) f3/f = 1.23

TABLE 4-continued (6) | f2/f | = 13.94
(7) G1BRf/(d11/n11 + d12/n12) = 3.01
(8) G1BRr/f = 1.04
(9) D/f = 0.80

Figure 9:
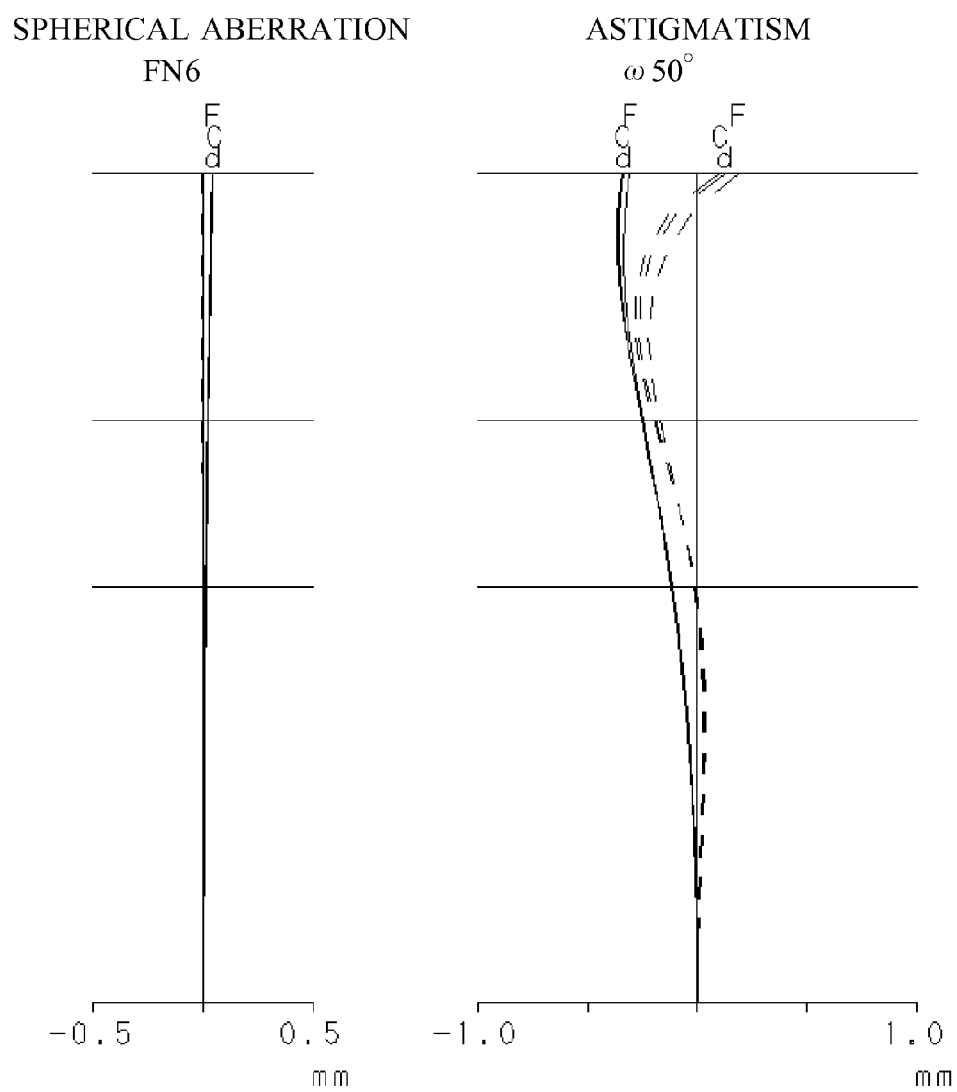
FIG. 9 is diagrams of aberrations in the fourth example.

As above, the ocular lens 3 according to the fourth example apparently satisfies all of conditional expressions (1) to (9) mentioned above. Moreover, FIG. 9 illustrates diagrams of aberrations for the spherical aberrations and the astigmatisms of the ocular lens 3 according to the fourth example to the rays at the d line, F line and C line. As apparent from the diagrams of aberrations illustrated in FIG. 9 and the values in the above-mentioned table of the specifications, the ocular lens 3 according to the fourth example is found to have favorably corrected aberrations across a sufficiently wide angle of view, and a sufficient eye relief attained without the total length being long while the increase in the lens diameter is suppressed.

Fifth Example

Figure 10:
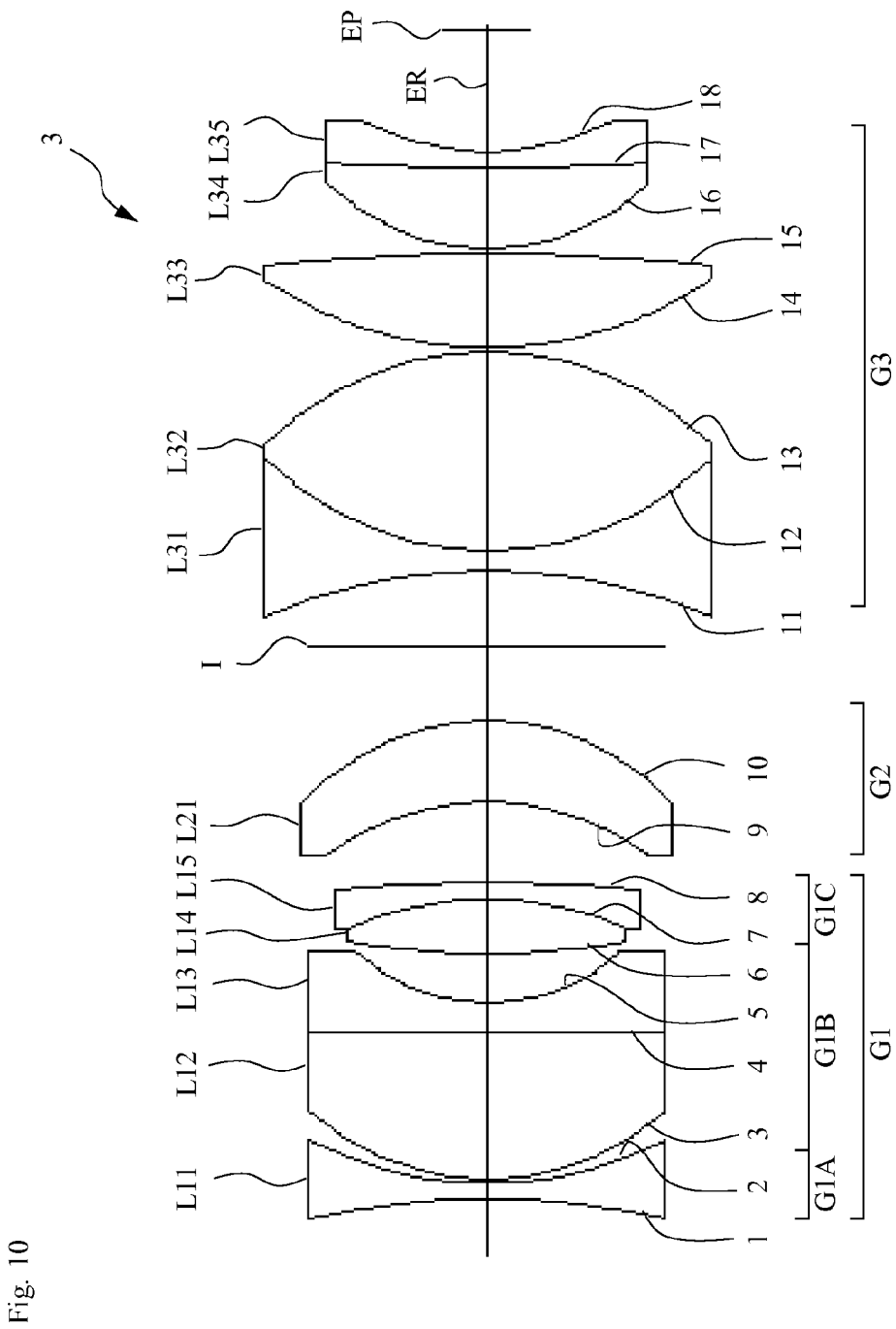
FIG. 10 is a lens configuration diagram illustrating a configuration of an ocular lens according to a fifth example.

FIG. 10 illustrates the ocular lens 3 according to the fifth example. In the ocular lens 3 according to the fifth example, the first lens component G1A included in the first lens group G1 is constituted of a biconcave lens L11 which is a lens component having negative refractive power in a shape having a concave surface facing the viewer's eye side, the second lens component G1B is constituted of a cemented lens which is in a meniscus shape having a convex surface facing the object side and constituted of a plano-convex lens L12 having a convex surface facing the object side and a plano-concave lens L13 having a concave surface facing the viewer's eye side, and the third lens component G1C is constituted of a cemented lens having positive refractive power constituted of a biconvex lens L14 and a negative meniscus lens L15 having a concave surface facing the object side. Moreover, the second lens group G2 is constituted of a negative meniscus lens L21 having a convex surface facing the viewer's eye side. Furthermore, the third lens group G3 is constituted, in order from the object side, of a cemented lens constituted of a biconcave lens L31 and a biconvex lens L32, an aspheric positive lens L33 in a biconvex lens shape, and a cemented lens constituted of a positive meniscus lens L34 having a convex surface facing the object side and a negative meniscus lens L35 having a convex surface facing the object side.

Herein, the surface of the aspheric positive lens L33 on the object side is formed into an aspheric shape. The aspheric surface is represented by the following expression (a), where y denotes the height in a direction perpendicular to the optical axis, S (y) denotes the distance (amount of sag) at the height y along the optical axis from a tangential plane at the vertex of the aspheric surface to the aspheric surface, r denotes the radius of curvature of the reference spherical surface (paraxial radius of curvature), K denotes the conical constant, and An denotes the n-th order aspheric coefficient.

$$S(y) = (y^2/r)/\{1+(1-\kappa y^2/r^2)^{1/2}\} + A4xy^4 + A6xy^6 + A8xy^8 + A10xy^{10} \quad (a)$$

Table 5 below presents specifications of the ocular lens 3 according to the fifth example illustrated in FIG. 10. Notably, in the lens data, * is given on the right side of the surface number when the surface is formed into an aspheric shape. Moreover, for the aspheric surface, Table 5 presents the values of the conical constant κ and the aspheric coefficients An in aspheric expression (a) mentioned above. Regarding the aspheric coefficients An, "E-n" designates "$\times 10^{-n}$". Herein, in the fifth example, the second order aspheric coefficient A2 is 0. Moreover, the surface numbers 1 to 18 presented in Table 5 correspond to the numbers 1 to 18 illustrated in FIG. 10.

TABLE 5

Overall Specifications f = 10
f1 = −311.0
f2 = 95.6
f3 = 11.95
2ω = 100°
ER = 6.85

LensData

| m | r | d | nd | vd |
|---|---|---|---|---|
| 1 | −47.89 | 0.91 | 1.517420 | 52.212 |
| 2 | 24.74 | 0.23 | | |
| 3 | 16.57 | 8.22 | 1.804200 | 46.486 |
| 4 | 0.00 | 1.60 | 1.749500 | 35.237 |
| 5 | 11.87 | 2.74 | | |
| 6 | 47.23 | 3.10 | 1.805180 | 25.432 |
| 7 | −21.68 | 0.91 | 1.497000 | 81.609 |
| 8 | −114.13 | 4.57 | | |
| 9 | −16.43 | 4.57 | 1.772500 | 49.615 |
| 10 | −15.07 | 8.29 | | |
| 11 | −35.85 | 1.14 | 1.805180 | 25.432 |
| 12 | 19.36 | 11.14 | 1.651600 | 58.597 |
| 13 | −19.36 | 0.23 | | |
| 14* | 25.16 | 5.25 | 1.804200 | 46.486 |
| 15 | −123.45 | 0.23 | | |
| 16 | 13.88 | 4.57 | 1.772500 | 49.615 |
| 17 | 140.95 | 0.91 | 1.761820 | 26.517 |
| 18 | 16.89 | (ER) | | |

Aspheric Data

| | κ | A4 | A6 | A8 | A10 |
|---|---|---|---|---|---|
| Fourteenth Surface | 0.306 | 0.554E−05 | 0.162E−07 | 0.000E+00 | 0.527E−13 |

Condition Compliant Value f1A = −31.4
f12 = 116.24
(1) | f1/f | = 31.10
(2) | G1ARf/G1ARr | = 1.94
(3) f1A/f = −3.14
(4) | f12/f | = 11.62
(5) f3/f = 1.20
(6) | f2/f | = 9.56
(7) G1BRf/(d11/n11 + d12/n12) = 3.03
(8) G1BRr/f = 1.19
(9) D/f = 0.83

Figure 11:
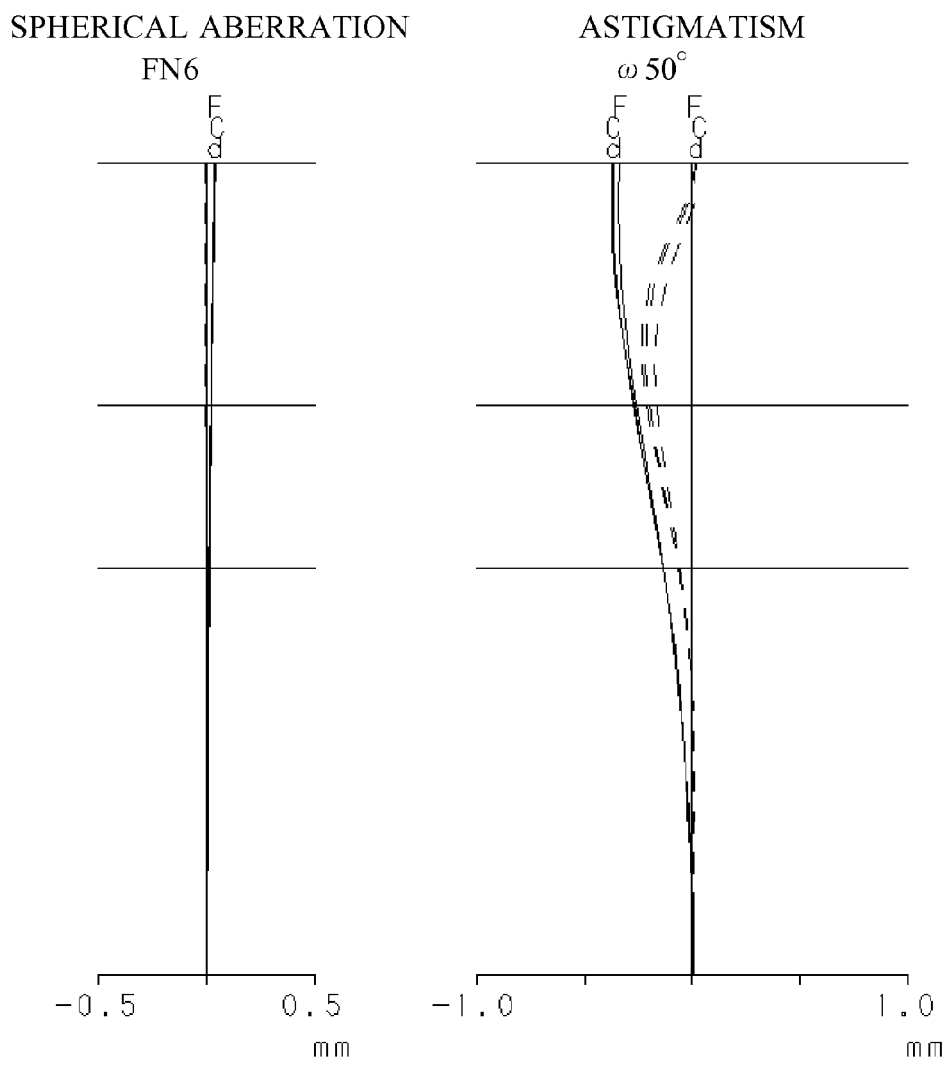
FIG. 11 is diagrams of aberrations in the fifth example.

As above, the ocular lens 3 according to the fifth example apparently satisfies all of conditional expressions (1) to (9) mentioned above. Moreover, FIG. 11 illustrates diagrams of aberrations for the spherical aberrations and the astigmatisms of the ocular lens 3 according to the fifth example to the rays at the d line, F line and C line. As apparent from the diagrams of aberrations illustrated in FIG. 11 and the values in the above-mentioned table of the specifications, the ocular lens 3 according to the fifth example is found to have favorably corrected aberrations across a sufficiently wide angle of view, and have a sufficient eye relief attained without the total length being long while the increase in the lens diameter is suppressed.

Notably, the requirements of the respective examples described above may be appropriately combined. In addition, there are cases where some constituent elements may not be used. In addition, all the publications and the disclosures of U.S. patents regarding an apparatus and the like cited in the respective examples and modified examples described above are incorporated herein by reference to the extent permitted by law.

REFERENCE SIGNS LIST

TS Telescope optical system (optical apparatus)
3 Ocular lens
G1 First lens group
G1A First lens component
G1B Second lens component
G1C Third lens component
G2 Second lens group
G3 Third lens group

The invention claimed is:

1. An ocular lens comprising: in order from an object side,
a first lens group;
a second lens group; and
a third lens group having positive refractive power, wherein
the first lens group has, in order from the object side, a first lens component having negative refractive power in a shape having a concave surface facing a viewer's eye side, a second lens component in a meniscus shape having a convex surface facing the object side, and a third lens component having positive refractive power,
the second lens group has a lens component having a convex surface facing the viewer's eye side,
an object side focal plane of the third lens group is positioned between the second lens group and the third lens group, and
a condition in the following expression is satisfied:

$$6 \leq |f1/f|$$

where f denotes an overall focal length, and f1 denotes a focal length of the first lens group.

2. The ocular lens according to claim 1, wherein a condition in the following expression is satisfied:

$$1.2 \leq |G1ARf/G1ARr|$$

where G1ARf denotes a radius of curvature of a surface on the object side of the first lens component included in the first lens group, and G1ARr denotes a radius of curvature of a surface on the viewer's eye side of the first lens component included in the first lens group.

3. The ocular lens according to claim 1, wherein the first lens component included in the first lens group has negative refractive power, and a condition in the following expression is satisfied:

$$-7 \leq f1A/f \leq -2$$

where f1A denotes a focal length of the first lens component.

4. The ocular lens according to claim 1, wherein a condition in the following expression is satisfied:

$$6 \leq |f12/f|$$

where f12 denotes a combined focal length of the first lens group and the second lens group.

5. The ocular lens according to claim 1, wherein a condition in the following expression is satisfied:

$$0.7 \leq f3/f \leq 1.5$$

where f3 denotes a focal length of the third lens group.

6. The ocular lens according to claim 1, wherein a condition in the following expression is satisfied:

$$5 \leq |f2/f|$$

where f2 denotes a focal length of the second lens group.

7. The ocular lens according to claim 1, wherein the second lens component included in the first lens group is a cemented lens, and a condition of the following expression is satisfied:

$$1.5 \leq G1BRf/(d11/n11 + d12/n12) \leq 5$$

where G1BRf denotes a radius of curvature of a surface, of the second lens component, that is closest to the object side, d11 denotes an on-axis distance of a lens which constitutes the cemented lens and is on the object side, n11 denotes a refractive index of a medium of the lens on the object side at a d line, d12 denotes an on-axis distance of a lens which constitutes the cemented lens and is on the viewer's eye side, and n12 denotes a refractive index of a medium of the lens on the viewer's eye side at the d line.

8. The ocular lens according to claim 1, wherein a condition in the following expression is satisfied:

$$0.6 \leq G1BRr/f \leq 1.8$$

where G1BRr denotes a radius of curvature of a surface, of the second lens component included in the first lens group, that is closest to the viewer's eye side.

9. The ocular lens according to claim 1, wherein the first lens component included in the first lens group is in a biconcave shape.

10. The ocular lens according to claim 1, wherein the third lens component included in the first lens group is a cemented lens.

11. The ocular lens according to claim 1, wherein a condition in the following expression is satisfied:

$$0.5 \leq D/f \leq 2$$

where D denotes an on-axis air space between the second lens group and the third lens group.

12. The ocular lens according to claim 1, wherein the second lens group is constituted of a lens component in a meniscus shape having a convex surface facing the viewer's eye side.

13. The ocular lens according to claim 1, wherein at least one of the surfaces of the lenses included in the first lens group, the second lens group and the third lens group is in an aspheric shape.

14. An optical apparatus comprising: the ocular lens according to claim 1.

* * * * *